J. SLEPIAN.
TERMINAL FOR ELECTROLYTIC CONDENSERS.
APPLICATION FILED JAN. 8, 1919.
1,381,356. Patented June 14, 1921.
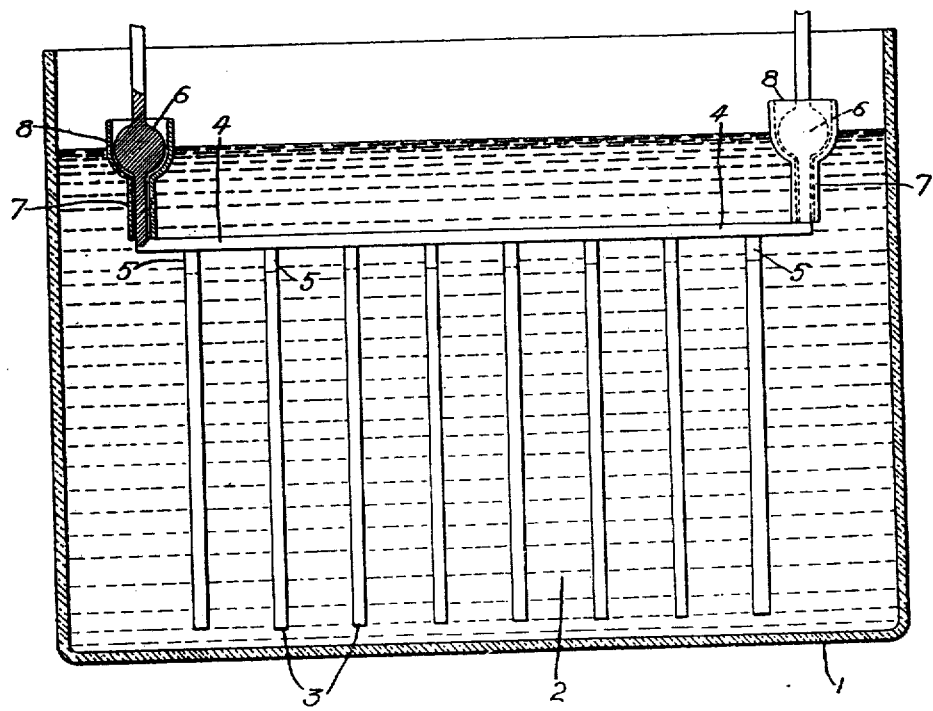
WITNESSES:
J. A. Helsel.
O. E. Bee.
INVENTOR
Joseph Slepian
BY
Wesley G. Carr
ATTORNEY

UNITED STATES PATENT OFFICE.

JOSEPH SLEPIAN, OF PITTSBURGH, PENNSYLVANIA, ASSIGNOR TO WESTINGHOUSE ELECTRIC & MANUFACTURING COMPANY, A CORPORATION OF PENNSYLVANIA.

TERMINAL FOR ELECTROLYTIC CONDENSERS.

1,381,356.      Specification of Letters Patent.     Patented June 14, 1921.

Application filed January 8, 1919. Serial No. 270,124.

*To all whom it may concern:*

Be it known that I, JOSEPH SLEPIAN, a citizen of the United States, and a resident of Pittsburgh, in the county of Allegheny and State of Pennsylvania, have invented a new and useful Improvement in Terminals for Electrolytic Condensers, of which the following is a specification.

My invention relates to terminals for electrodes of electrolytic condensers, lightning arresters, rectifiers and the like by means of which the electric current enters and leaves an electrolytic bath.

It is commonly known that the terminals of apparatus of the character above designated, become corroded, during use, at the points where they protrude from the electrolyte into the air or other gases above the electrolyte. The rate of this corrosion varies somewhat with different electrolytes because of differences in chemical composition and concentration. In time, the corrosion may reach such depth as to cause the electrode terminal to break off by reason of its own weight or by reason of jars or vibrations to which it may be subjected. Some electrolytes, which are electrically satisfactory, are not applicable to commercial use on account of rapid deterioration of their terminals. Other electrolytes, which are satisfactory as first supplied, in a short time become so concentrated by evaporation that they attack and corrode the terminals.

Furthermore, this corrosion or incrustation of the terminals, particularly in electrolytic condensers, is a source of a serious current leakage and, consequently, of a material watt loss.

I have discovered that this corrosion of the terminals at the juncture of the electrolyte and supernatant gas, and all salt formation upon the terminals at this point, together with the usual current leakage caused by this corrosion, are eliminated if the voltage between the terminals and the immediately adjacent electrolyte is kept at a substantially zero value.

The primary object of my invention resides, therefore, in the provision of a simple and effective means for maintaining a substantially zero potential difference between the electrode terminals and the electrolyte immediately surrounding them adjacent to the point where the terminals emerge from the electrolyte.

Another object of my invention is to provide an electrode terminal for condensers, rectifiers, lightning arresters and the like which shall obviate corrosion at the points where the terminals emerge from the electrolyte and thereby increase the length of continuous service of such apparatus.

A still further object of my invention is to provide an electrode terminal for condensers and the like by the employment of which the condensers may be made more compact than has heretofore been found possible, by obviating the necessity of providing a removable electrode terminal.

The accompanying drawing is a side view, partly in section and partly in elevation, of an electrolytic condenser to which my invention is applied.

In order to insure a clear and accurate understanding of my invention, I have shown an electrolytic condenser comprising a tank 1 formed of glass or other suitable material and an electrolyte 2 contained therein. Two series of suitable plates 3 of any desirable material, such, for instance, as aluminum, are alternately connected, in the usual manner, by terminals 4 of similar material, the plates 3, preferably, having projecting portions 5 to which the terminals 4 are connected. At the points of emergence from the electrolyte 2, the terminals 4 have a thickened portion 6 and are surrounded by glass or other dielectric sleeves 7, each of which has an enlarged upper end 8 to receive the corresponding thickened portion 6. As shown in the drawing, the dielectric members 7 closely surround the terminals 4 adjacent to their points of emergence from the electrolyte but are spaced therefrom and, being open at both ends, allow access of relatively thin layers of electrolyte around the terminals.

By providing thin layers of electrolyte around the terminals at their points of emergence from the electrolyte, a path for electric current is provided having a high resistance which is interposed between the body of the solution and the point where the terminals protrude therefrom. Furthermore, by providing the terminals with thickened portions near the surface of the electrolyte, the capacity current drawn will cause the IR drop in the thin layers of solution to be substantially equal to the voltage impressed upon the condenser and, consequently, there will be very little difference, if any, of potential between the leads or terminals and the solution inside the glass or dielectric sleeves at the surface of the electrolyte. By thus insuring substantially zero potential between the terminals and the electrolyte, where the terminals emerge from the electrolyte, sparking and resultant corrosion are avoided.

The renewal of corroded terminals has long been recognized as a great disadvantage in the employment of electrolytic condensers and like apparatus, and a simple and effective means for avoiding this necessity of renewing the terminals of the electrodes is considered a distinct advance in the art, especially in view of the fact that the means by which this corrosion is avoided comprises an inexpensive and easily manufactured device.

It is obvious that, by employing the principle of my invention, various devices may be manufactured which fall within its scope and I desire, therefore, that no limitations shall be imposed other than those indicated in the appended claims.

I claim as my invention:

1. A method of preventing corrosion of the terminal of an electrode of a condenser, rectifier, lightning arrester or the like that comprises providing an increased volume of conducting material at a portion of the terminal and trapping a thin layer of electrolyte about the terminal adjacent the point where it emerges from the electrolyte.

2. A method of preventing corrosion of the terminal of an electrode of a condenser, rectifier, lightning arrester or the like that comprises providing an increased volume of conducting material at a portion of the terminal and surrounding the said portion of increased volume and a part adjacent thereto by a dielectric material.

3. A method of preventing corrosion of the terminal of an electrode of a condenser, rectifier, lightning arrester or the like that comprises providing the terminal with a thickened portion adjacent the point where it emerges from the electrolyte and surrounding said thickened portion and an adjacent part by a glass sleeve flared at one end and open at both ends whereby a thin layer of electrolyte is permitted engagement with the terminal near the surface of the electrolyte.

4. In a condenser, rectifier, lightning arrester or the like, the combination with a container, an electrolyte therein and an electrode terminal projecting from the electrolyte, of means for establishing substantially zero potential between the terminal and the adjacent portion of the electrolyte.

5. In a condenser, rectifier, lightning arrester or the like, the combination with a container, an electrolyte therein and an electrode terminal projecting from the electrolyte, of a dielectric sleeve disposed about the terminal where it projects from the surface of the electrolyte to provide a thin layer of electrolyte surrounding the terminal and for establishing substantially zero potential between the terminal and the thin layer of electrolyte surrounding it.

6. In a condenser, rectifier, lightning arrester or the like, the combination with a container, an electrolyte therein and an electrode terminal projecting from the electrolyte, of means for laterally screening off a thin terminal-surrounding portion of electrolyte from the remainder of the electrolyte and for establishing substantially zero potential between the terminal and the terminal-surrounding electrolyte.

7. In a condenser, rectifier, lightning arrester or the like, the combination with a container, an electrolyte therein and an electrode terminal projecting from the electrolyte, of means for increasing the current capacity of the terminal adjacent the surface of the electrolyte and means for increasing the IR drop per unit section in the electrolyte immediately surrounding the terminal.

8. A terminal for condensers, rectifiers, lightning arresters or the like comprising a metallic member having a thickened portion and a glass sleeve of sufficient diameter to surround said member and to provide a relatively small space between the member and the sleeve.

9. A terminal for condensers, rectifiers, lightning arresters or the like comprising an aluminum member having a thickened portion and a glass sleeve flared at one end and surrounding said member.

In testimony whereof I have hereunto subscribed my name this 19th day of Dec., 1918.

JOSEPH SLEPIAN.